United States Patent [19]

Hagerman et al.

[11] Patent Number: 4,775,245

[45] Date of Patent: Oct. 4, 1988

[54] MULTI-PHASE ELECTRONIC TEMPERATURE CONTROLLER

[75] Inventors: Richard E. Hagerman, Penfield; John R. Bodker; Joseph F. Foster, both of Fairport, all of N.Y.

[73] Assignee: Qualitrol Corporation, Fairport, N.Y.

[21] Appl. No.: 940,551

[22] Filed: Dec. 12, 1986

[51] Int. Cl.⁴ .................. G01K 1/02; G01K 13/00
[52] U.S. Cl. ................... 374/134; 73/865.9; 374/152
[58] Field of Search .............. 374/152, 133, 134; 364/557; 336/55; 73/865.9

[56] References Cited

U.S. PATENT DOCUMENTS

| | | | |
|---|---|---|---|
| 2,834,920 | 5/1958 | Lennox et al. | 374/134 X |
| 3,144,770 | 8/1964 | Sheely | 374/152 |
| 3,148,349 | 9/1964 | Rose et al. | 374/134 X |
| 3,289,478 | 12/1966 | Tokunaga et al. | 374/134 |
| 4,258,570 | 3/1981 | Weiler | 374/152 |

FOREIGN PATENT DOCUMENTS 0536421  1/1957  Canada ............... 374/152

OTHER PUBLICATIONS

"Automated Transformer Temperature Rise Tester", A. L. Sandeen et al., IBM Technical Disclosure Bulletin, vol. 22, No. 6 (11/1979).

"Electronics Circuits Discrete & Integrated", by Donald L. Schilling and Charles Belove, pp. 42–49, (Diode Circuit Analysis) McGraw Hill Co., 1968.

Primary Examiner—Daniel M. Yasich
Attorney, Agent, or Firm—Charles L. Johnson, Jr.

[57] ABSTRACT

A method and system is provided for electronically simulating, indicating and controlling the temperature of liquid cooled multi-phase electric power transformers. The temperatures of transformer windings are electronically computed from the actual top oil temperature and the computed incremental additional temperatures resulting from the transformer winding currents to determine the hottest spot temperature. The signals representative of the winding current for each phase of the multi-phase transformer are time processed to simulate the rate of rise of winding temperature resulting from those currents. A square-law function is generated to make a winding bias parameter for each winding. The signals representative of the actual and incremental additional temperature are added for each transformer phase and the largest signal, representative of the hottest winding is used to indicate and control the transformer temperature.

13 Claims, 8 Drawing Sheets

MULTI-PHASE ELECTRONIC TEMPERATURE CONTROLLER

BACKGROUND OF THE INVENTION

1. Field of the Invention

This invention relates to a method and apparatus for simulating, indicating and controlling the temperature of electric power transformers of the type used by public utilities. These types of transformers typically have their transformer windings immersed in a liquid coolant. During operation of the power transformer it is important to know the temperature of the hottest transformer winding, the maximum temperature each winding has reached, when cooling fans and pumps should be turned on and off and when power to the transformer should be turned off.

2. Discussion of Prior Art

This invention represents a variation of that described in U.S. Pat. No. 4,745,571 which issued from application Ser. No. 772,133 filed Aug. 30, 1985 and Ser. No. 829,214 filed Feb. 14, 1986 of Joseph F. Foster. It is known from prior systems to simulate the winding temperatures by measuring the top oil temperature of the transformer and biasing the thermometer reading for each winding, by an amount proportional to the corresponding transformer load, or winding current, so as to simulate each winding temperature. Such a system employs thermometers with sensing elements measuring the top oil temperature, current transformers to provide signals proportional to transformer loads, heater coils to provide the bias and auto transformers to adjust the current supplied to the heater coils.

It is an object of this invention, rather than have biasing heaters, to modulate the actual oil temperature in a transformer, to provide a method and apparatus to electronically determine the winding temperatures based on the oil temperature in the transformer and the increased temperatures that result from currents flowing through the transformer windings.

It is a further object to provide an improved adjustable transformer winding temperature simulator, indicator and controller which may be adjusted or programmed to provide variable temperature increments to the oil temperature in accordance with the multi-phase transformer manufacturers specification for temperature change at various transformer loads or winding currents. A different temperature increment is provided for each relay output to accommodate accurate control, and a complete separate simulator circuit for each transformer winding.

SUMMARY OF THE INVENTION

The invention aims to provide a new solution to the above-mentioned problems, that is, a multi-phase electronic temperature simulator, monitor and controller. Specific winding current temperature rise relationships can be programmed for any class of power transformer. Transformer top oil temperature is continuously measured. A sample of each transformer winding current is also continuously measured. Each winding current signal is then processed with a specific time constant such that its load current heating effect is time-scaled to approximate actual winding temperature rise due to its load current. Winding temperature rise is proportional to winding power dissipation and power dissipation is proportional to the "square" of winding current. Due to this square-law relationship, the load current signal is then applied to a function generator that creates a square law relationship between its input and output voltages. The function generator output is the winding temperature rise for the phase, and this winding temperature rise is then added to the top oil temperature analogy to accurately simulate and indicate the temperature of this winding. The signal representative of the highest winding temperature of the various phases is automatically selected by a high value selector. This hottest winding temperature analogy is then used to operate switches that operate transformer cooling devices, shut offs, and alarms. The hottest simulated temperature reached by each winding, and the hottest liquid (top-oil) temperature measured, are all stored in a non-volatile electronic memory, and these stored values can be displayed.

The multi-phase Electronic Temperature Controller allows separate programming of important parameters for Winding Temperature Simulations. The input current range, winding bias value, and time constant for each phase, as well as output relay set points which can be chosen independently so that an electric power transformer can be simulated more precisely than previously possible, and the simulation process retains its accuracy as conditions change.

An important feature over prior devices is the use of a complete, separate simulator circuit for each phase of a multi-phase transformer, so that each winding temperature is continuously available to the maximum memory circuitry and the remote winding temperature indicators through constant current sources provided.

DESCRIPTION OF THE INVENTION

Because direct measurement of power transformer winding temperatures is not economically feasible, means to simulate these temperatures have been devised in the past.

Figure 1:
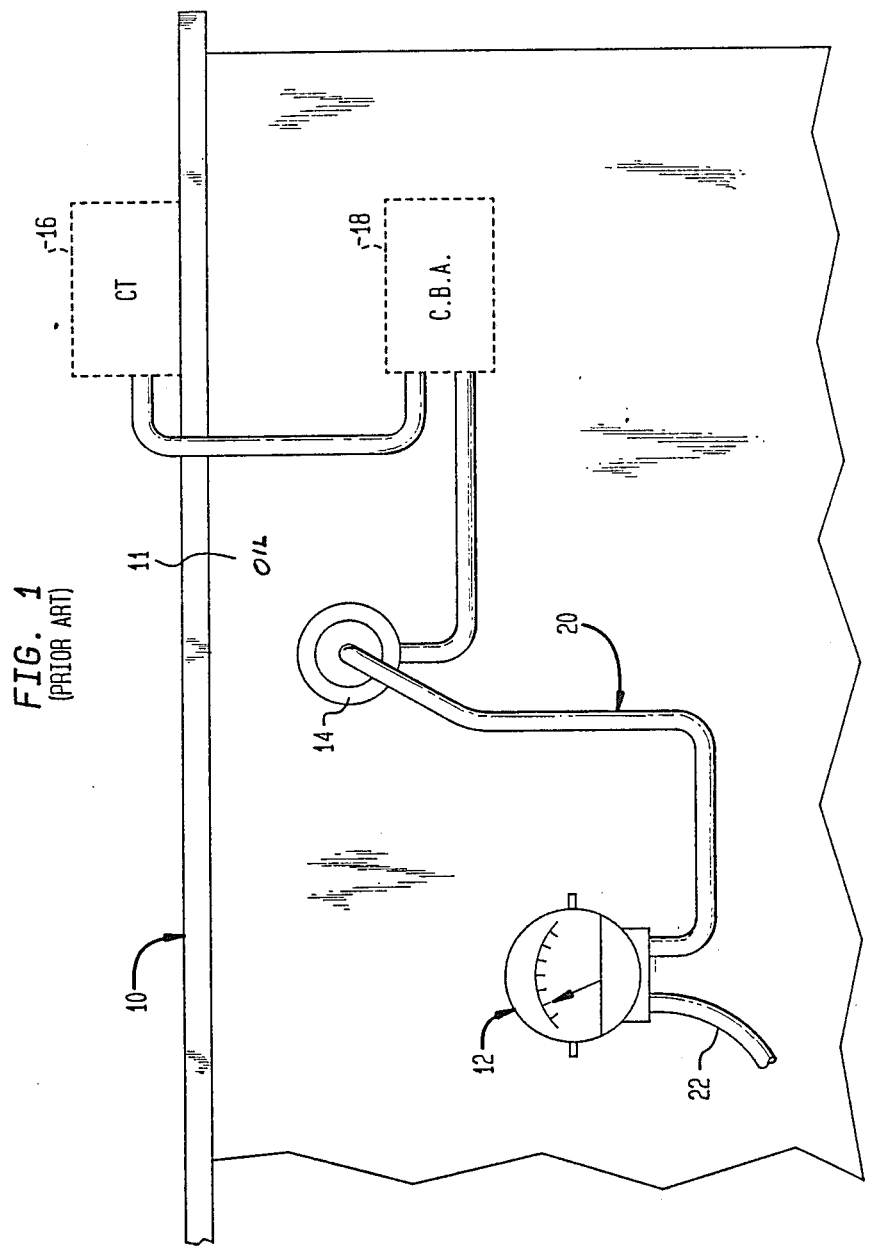
FIG. 1 is a representation of one form of a prior art winding temperature simulation system.

One such prior system is shown in FIG. 1 and uses a heater coil in the transformer oil to increase the temperature of the oil near the heat sensor, by an amount approximate that which would occur from the current in the transformer winding.

In FIG. 1 the power transformer 10 has oil 11, a thermometer indicator 12 whereby an observer may view the reading of the power transformer winding temperature. The heater coil and sensing element 14 is provided to generate the input signal to the thermometer indicator 12 via capillary element 20. The sensing element portion of the heater coil and sensing element 14 responds to the temperature of the transformer oil 11 near the sensor to provide the reading information to the thermometer 12. Alarm leads 22 control alarm apparatus, not shown. The heater coil 14 is controlled by the current transformer 16 which is normally available from the transformer manufacturer who additionally is aware of the various temperature differences which may be expected to result from different load currents i.e. winding currents. A current balancing auto-transformer 18 responds to the current transformer 16 signal which is proportional to transformer load current and provides the heater coil 14 with the current to heat the oil near the sensor by an amount corresponding to that expected for a given load current. In this way it is seen that prior systems used a sensor to detect the top oil temperature, which was locally modified or biased by a heating coil responsive to transformer winding current. Examples of prior art systems using a heater coil to heat the oil or liquid in accordance with winding current are shown or described in U.S. Pat. Nos. 2,834,920; 3,144,770; 3,148,349; and 4,258,570. Many electric power transformers contain three winding temperature simulators, one for each winding phase.

Figure 2:
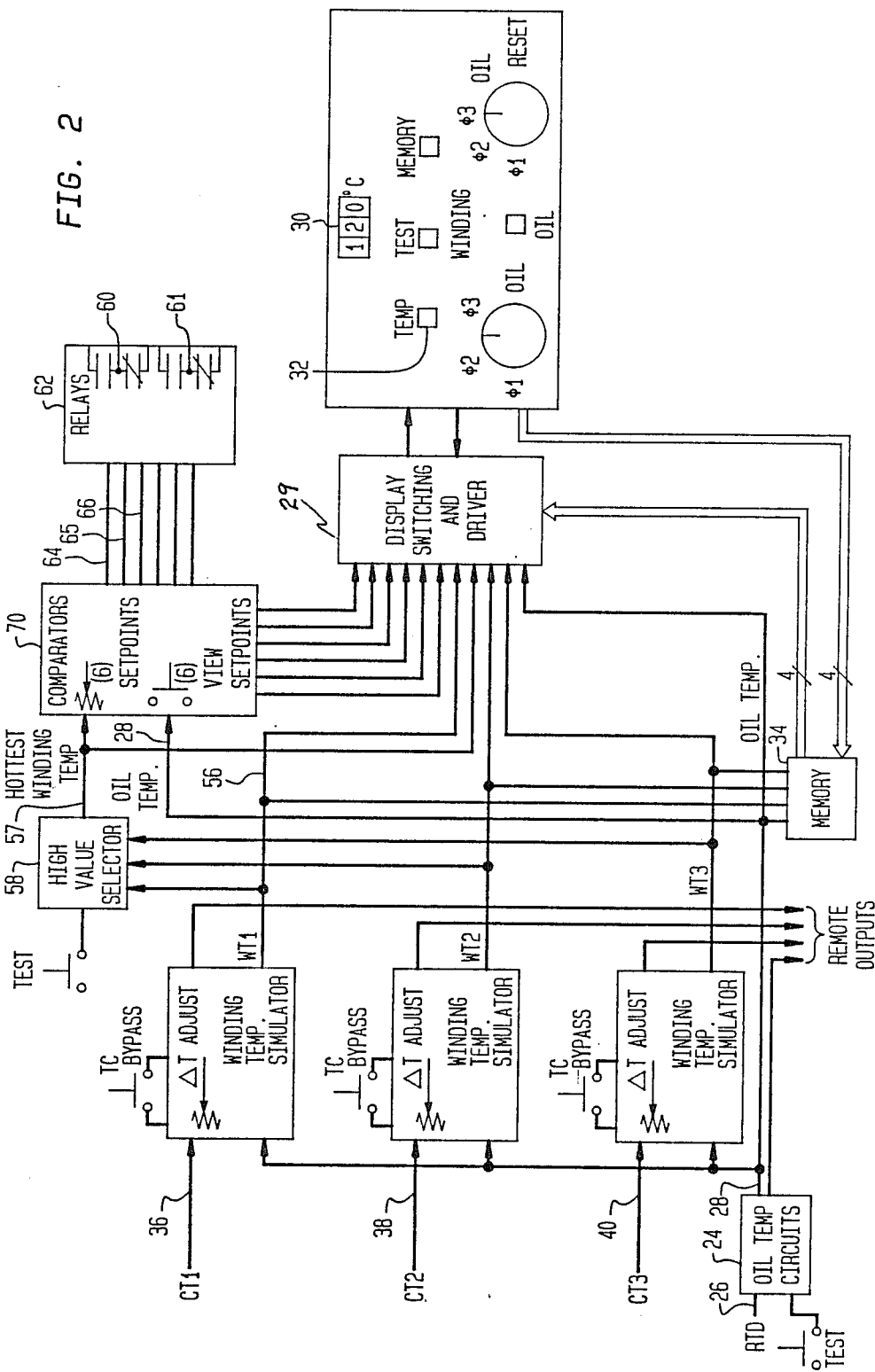
FIG. 2 is a schematic block diagram of a multi-phase electronic temperature simulator, indicator and controller of this invention.

Turning now to the present invention, FIG. 2 is a schematic block diagram of the temperature simulators, indicator and controller. In essence, liquid oil temperature and the incremental temperature due to transformer winding current induced heating effect are added to generate simulated winding temperature values, which are used to determine the hottest winding temperature and control corrective apparatus such as fans, alarms, trips and winding temperature memory devices.

In a preferred embodiment of the invention, as shown in FIG. 2, a D.C. voltage from 0 to 3.33 volts is generated by the oil temperature circuitry 24 responsive to a Resistance Temperature Detector (RTD) 26 and is applied to conductor 28 which then has a signal representative of liquid temperature. The indicator 30, when the "Temp" button 32 is depressed, displays the liquid temperature.

Figure 3:
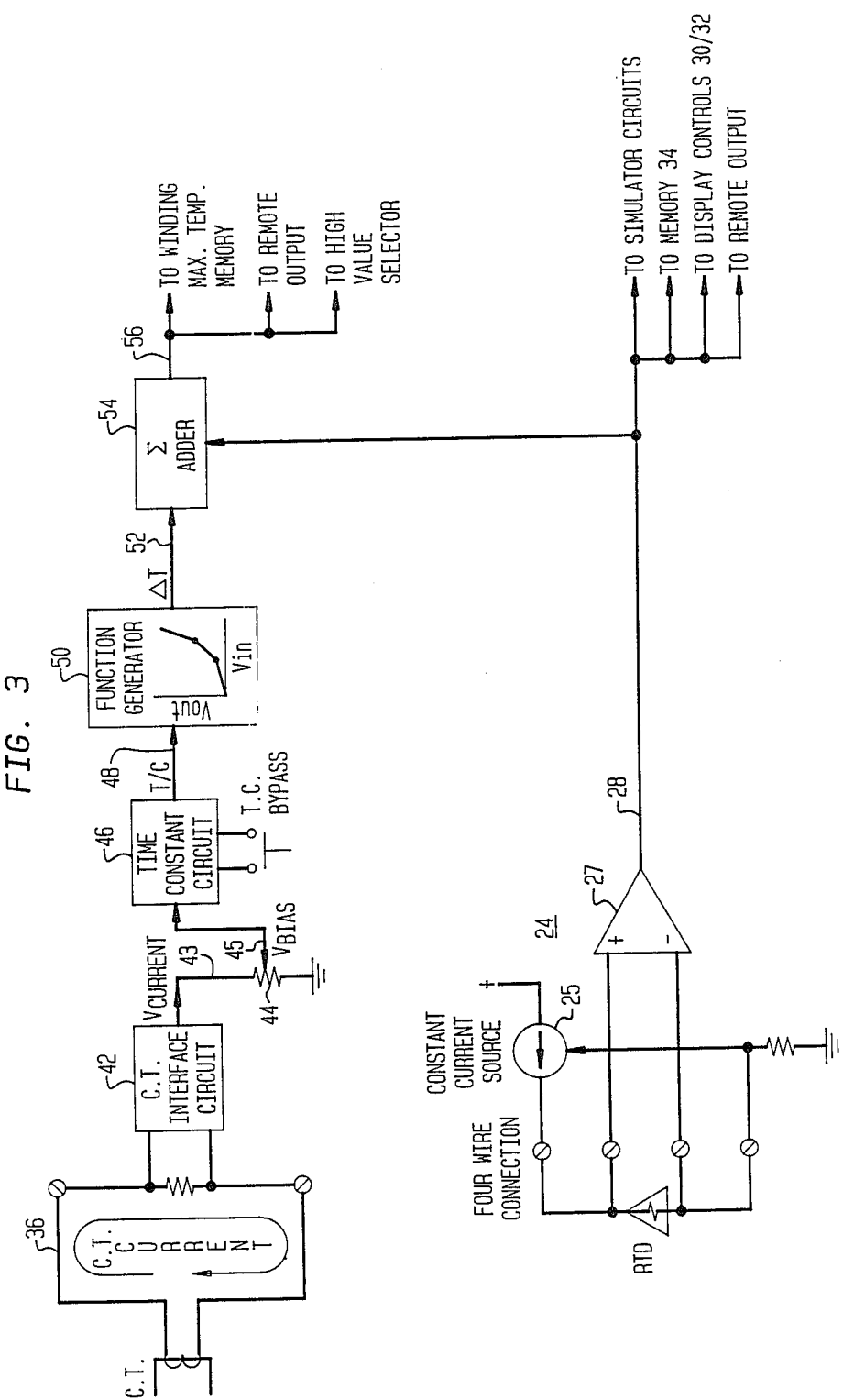
FIG. 3 is a schematic block diagram of one winding temperature simulator, including the Resistance Temperature Detector Interface.

FIG. 3 includes a schematic block diagram of the RTD interface and amplifier functions. Liquid temperature signal 28 is also connected to the liquid temperature memory 34 where the hottest value will be stored. This stored value can also be displayed on temperature indicator 30.

Continuing with FIGS. 2 and 3, the current transformers 36, 38, and 40, for the three phases, are connected to a complete winding temperature simulator for each phase. FIG. 3 is the schematic block diagram for one simulator. Each simulator first converts the input current from the appropriate current transformer C.T. to a D.C. voltage that represents present winding load current. This is accomplished by the Current Transformer Interface Circuit 42. The amplitude of this load signal is then programmed by winding bias adjustment 44 to provide the desired load current-to-winding-bias relationship at the required load current data point. Next, the load current signal 45 is time processed by its own time-constant (T.C.) circuit 46, such that the rate of rise and rate of decay of this load signal accurately approximates the time-constant response characteristic of load current heating of actual transformer windings. This time processed load signal on conductor 48 is then applied to its function generator circuit 50. This generator makes use of the square-law relationship between winding current and temperature rise to create the winding bias or $\Delta T$, differential temperature, signal on conductor 52. The differential temperature or temperature differential represents the change in fluid temperature to be expected from the current through the transformer winding. In the case of a 3 phase transformer there will be three differential temperatures to be simulated, based on the current through each winding. The winding bias signal 52 is then added to the liquid temperature signal 28 in the adder circuit 54. The output 56 of the adder circuit 54 represents the present winding temperature for this phase.

A simulator for each phase creates the winding temperature signal for each phase. The highest winding temperature signal 57, indicating the hottest phase, is automatically selected by the high value selector 58. The high value selector 58 is in effect a comparator which permits the passage of the largest phase signal to be applied to conductor 57. This highest value is displayed via Display Switching and Driver 29 on the display meter 30 and used to operate relays for cooling devices, alarms, and trip circuits. Any of the relays could also be operated from the liquid temperature signal 28. The highest oil temperature and the highest winding temperature for each phase are stored in the maximum temperature memory 34, and can be displayed on the display meter 30. The memory devices retain the value of the highest winding and liquid temperatures measured during the time of interest. Between these times they can be manually reset. These memory devices are non-volatile memories.

Each of the output relays 60, 61, located on an Input-Output Termination module 62, responds to the winding or liquid temperature voltages on conductors 28 or 57. In each case a comparator 70, well known in the electronics art, compares the selected temperature signal with a preset temperature limit so that a relay driver will activate a relay 60 or 61 upon the event of the selected temperature value exceeding the preset limit. Each comparator circuit 70 has a preset differential, that is a hysteresis, such that when a relay is activated (the set point is exceeded) the relay will remain activated until the temperature value drops below the set point by an amount equal to the hysteresis. Hysteresis for a fan circuit is typically set to 15° C. Exceeding the preset limit for a comparator will cause its relay to be activated or deactivated, as determined for each relay by jumper selection in its relay driver circuit.

FIG. 3 includes a block diagram of the resistance temperature detector (RTD) circuit 24. Current source 25 and amplifier circuits 27 create a DC voltage on conductor 28, that is the analogy for liquid temperature measured by resistance temperature detector 26. In the preferred embodiment, 0 to 3.33 VDC on conductor 28 indicates and represents liquid temperatures of 0° C. to 120° C.

The interface circuits 42 and viewing resistor R, for C.T. current inputs from the constant current transformers (CT) 36 generate DC voltages that represent the winding load currents. The scale factor, for each interface, is set to 1.0 VDC per AC ampere of input CT current at conductors 43 and this scale factor is then divided and individually adjusted for each winding by setting the winding bias adjustment 44 for each winding input. In this way, an input current value can be adjusted to become a winding bias signal of 0 VDC to a portion of each interface output. The winding bias output 45 is then connected to time constant circuits 46 such that each winding load signal is time-scaled to accurately represent load current heating effects. The present devices are programmed for an eight minute time constant; that is, a total response time of forty minutes. The output of each time constant circuit on conductor 48 amplifies its winding bias signal input by a factor of 100 such that the D.C. output fed to the function generator 50 can have any scale factor of from zero to 1.47 VDC per AC ampere of C.T. current, adjustable for each winding.

A characteristic of power transformers and their winding temperatures is that different transformers have different temperature characteristics. For each power transformer there will be a characteristic relationship between the incremental temperature variations $\Delta T$ and the winding currents.

Figure 4:
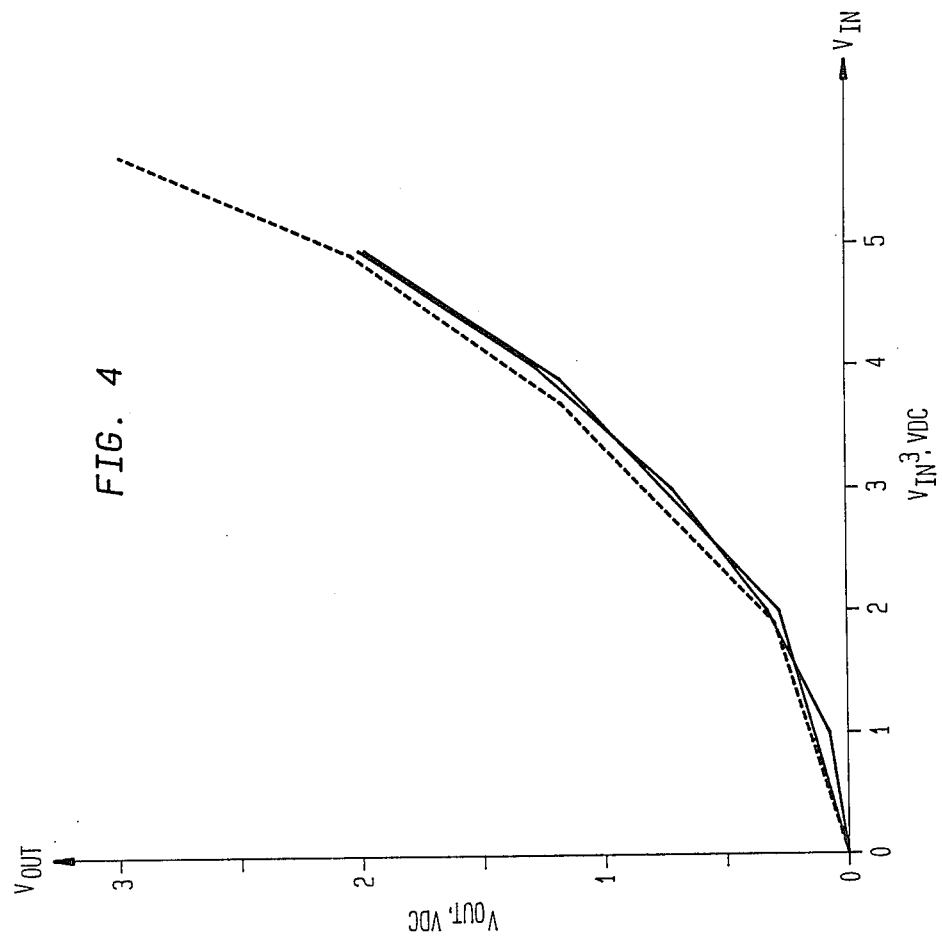
FIG. 4 represents the function generator square-law curve, Vin v.s. Vout, showing break points and line segments.

FIG. 4 illustrates the function generator characteristic curve. The horizontal axis, Vin from the time-constant circuit conductor 48, is the bias-scaled, time-processed winding current signal. The vertical axis, Vout on conductor 52, is the function generator output voltage. The generator circuit creates a 'square-law' relationship between Vin and Vout. Vout then represents the appropriate winding bias signal 52 which is then added with the top oil signal 28 in the adder circuit 54 such that the adder output signal 56 represents simulated winding temperature signal. The simulated winding temperature signal for all phases are continuously evaluated by the high-value selector circuit 58 which selects the highest simulated winding temperature signal for display and control purposes. This selected highest winding temperature represents the hottest spot winding temperature which is used to control the output relays. These relays can be used to control cooling devices, alarms, trip circuits, annunciators etc. Any number of relays can be controlled in this manner and any relay can be activated by comparators that act upon either liquid temperature or the hottest winding temperature.

Figure 5:
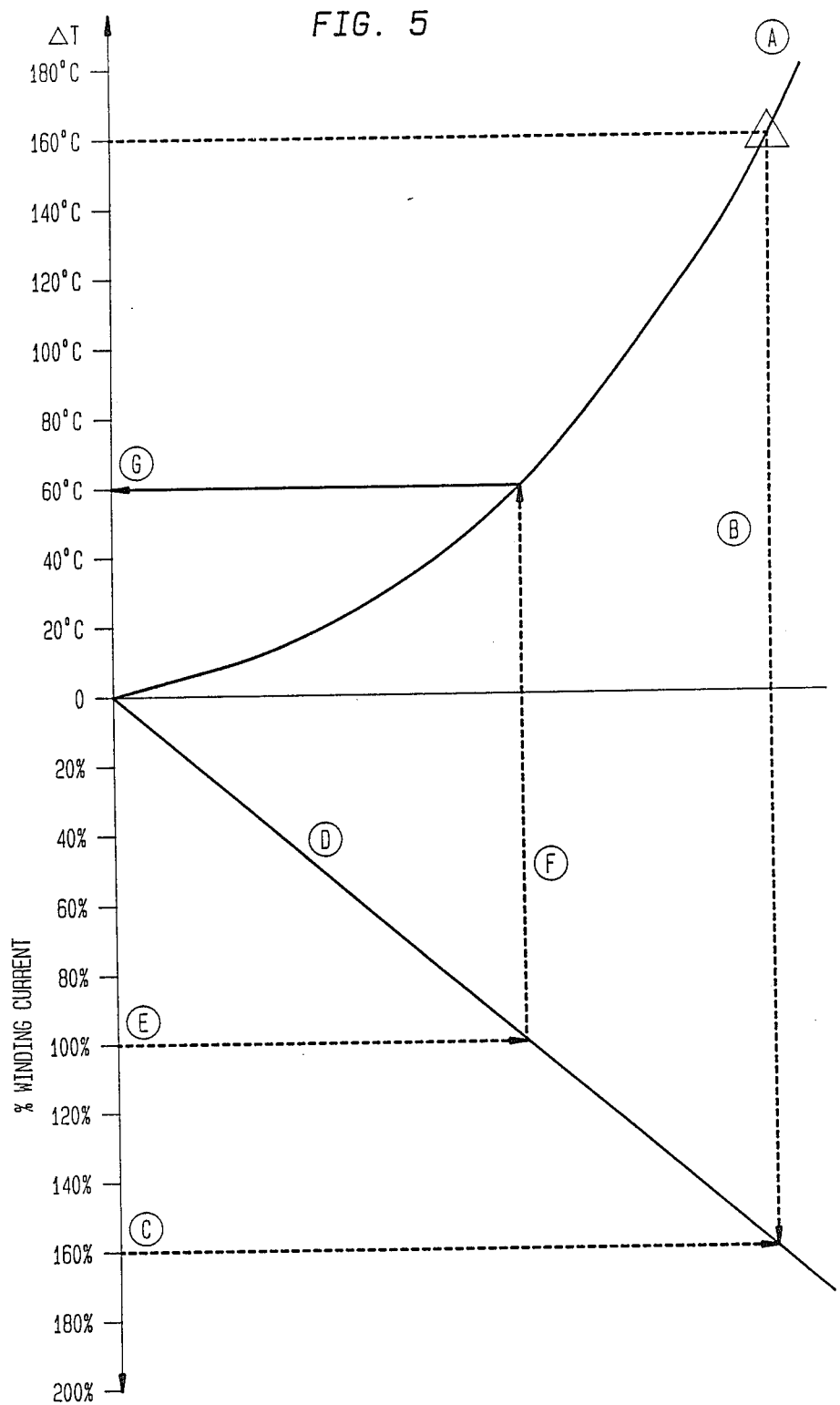
FIG. 5 is an application example of using the square-law curve of FIG. 4.

The square-law curve shown in FIG. 4 is easily applied to transformer winding temperature simulation as demonstrated in FIG. 5. The operating line (D) is constructed for an example transformer that exhibits a 160° C. winding temperature rise at 160% rated load. This operating line, once constructed, will determine the winding temperature rise for other load levels. Because the time constant circuits hold back the winding bias calculations for five time constants, a time-constant bypass switch is provided to temporarily eliminate the time constant. As long as the T/C bypass switch is depressed, any input current that creates a winding bias signal will appear immediately on a winding temperature conductor.

The temperature signals are scaled such that 27.78 mVDC represents 1° C., for both winding and oil temperatures.

Figure 7A:
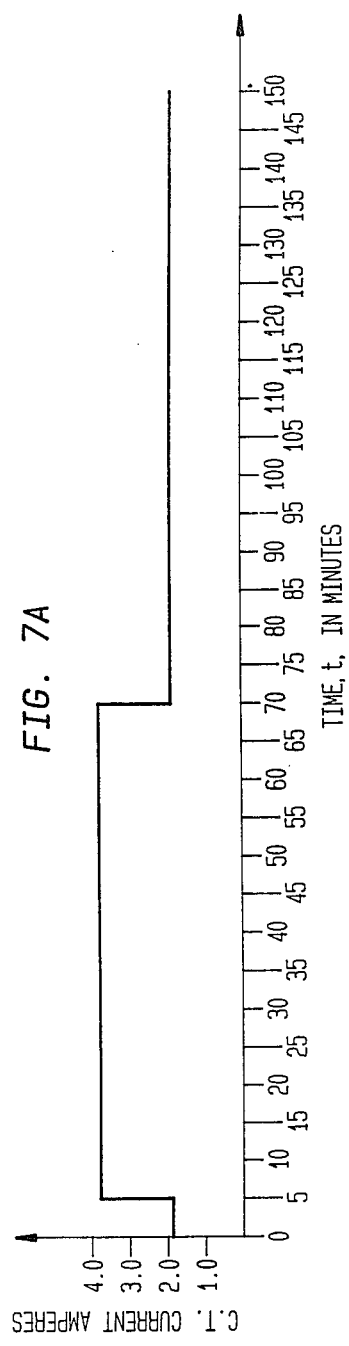
FIG. 7A is a Current Transformer current example.
Figure 7B:
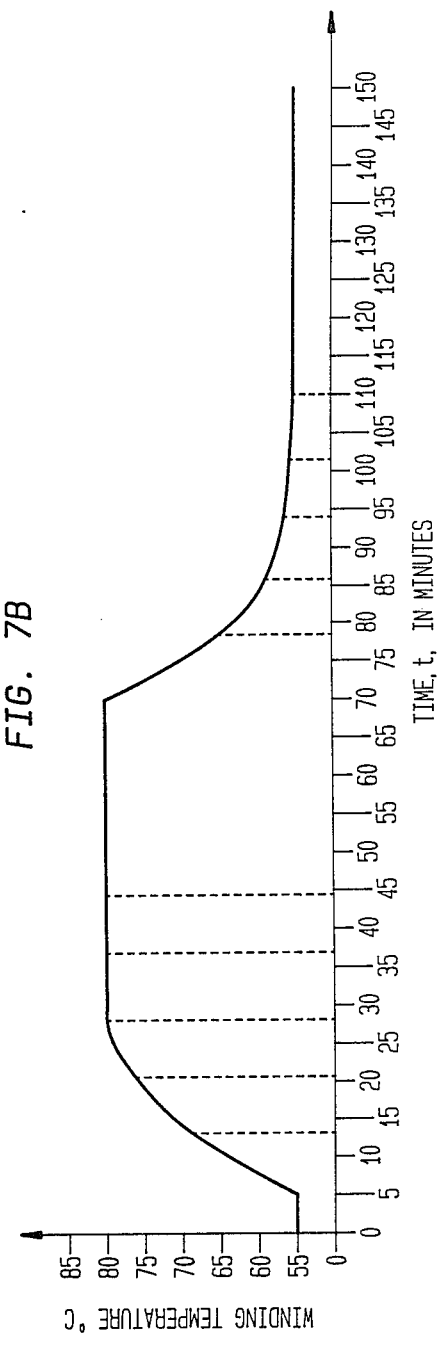
FIG. 7B is the simulated winding temperature example signal.

The following example describes operation of a simulator as shown in FIG. 3A. Winding bias has been set for VBias=1 V./A. of C.T. current. See FIGS. 7A and 7B.

I. Initial "steady-state" conditions: at time T=0.
 1. Oil Temperature=45° C.
 2. C.T. (1) current=1.9 A.:V Current=1.9 VDC
 3. VBias=1.9/100=19 mVDC on conductor 45
 4. T/C Signal=1.9 VDC=1 V/A
 5. $\Delta T$ Signal=280 mVDC=See FIG. 4.
 6. Oil Temperature Signal=1.25 VDC
 7. Winding Temperature Signal=1.53 VDC
 Indicating a present winding temperature of 55° C.

II. Rising Temperature Condition: Time T>0
 1. At T=5 min.
  a. C.T. current, FIG. 7A abruptly rises from 1.9 A to 3.6 A and remains at 3.6 A for 65 minutes: VCurrent becomes 1.9 VDC.
  b. VBias immediately changes to 36 mVDC where it remains for 65 minutes.
  c. T/C signal 48 begins charging exponentially from 1.9 VDC toward a final value of 3.6 VDC.
  d. $\Delta T$ signal begins rising exponentially from 280 mVDC toward a final value of 970 mVDC.
 2. At $5 \leq T \leq 45$ min.:
  a. $\Delta T$ signal is rising with a time constant of 8 minutes, toward 970 mVDC.
  b. Winding temperature output is rising exponentially toward a final value of a final value of 80° C.—See FIG. 7B.

III. At 45 min.$\leq T \leq 70$ minutes=all signals are stabilized, simulated winding temperature remains constant at 80° C.

IV. Falling temperature condition: At 70 minutes$\leq T \leq 110$ minutes
  a. Load current, FIG. 7A, abruptly drops from 3.6 A to the original value of 1.9 A and remains at 1.9 A for all remaining time.
  b. VBias immediately drops back to 19 mVDC where it remains for all time.
  c. T/C signal begins decaying exponentially, time constant=8 minutes, from 3.6 V back to the original 1.9 VDC value.
  d. $\Delta T$ signal begins dropping to its original value of 280 mVDC.
  e. Simulated winding temperature drops back to 55° C.

V Final steady state=Time>110 minutes
 All conditions have returned to the same values as those in Section I.

An example of designing function generators may be found in the publication "Electronic Circuits: Discrete and Integrated" by Donald L. Schilling and Charles Belove published by McGraw-Hill Book Company, Library of Congress Catalog Card No. 68-19493, pages 42–49, 1968.

Figure 6:
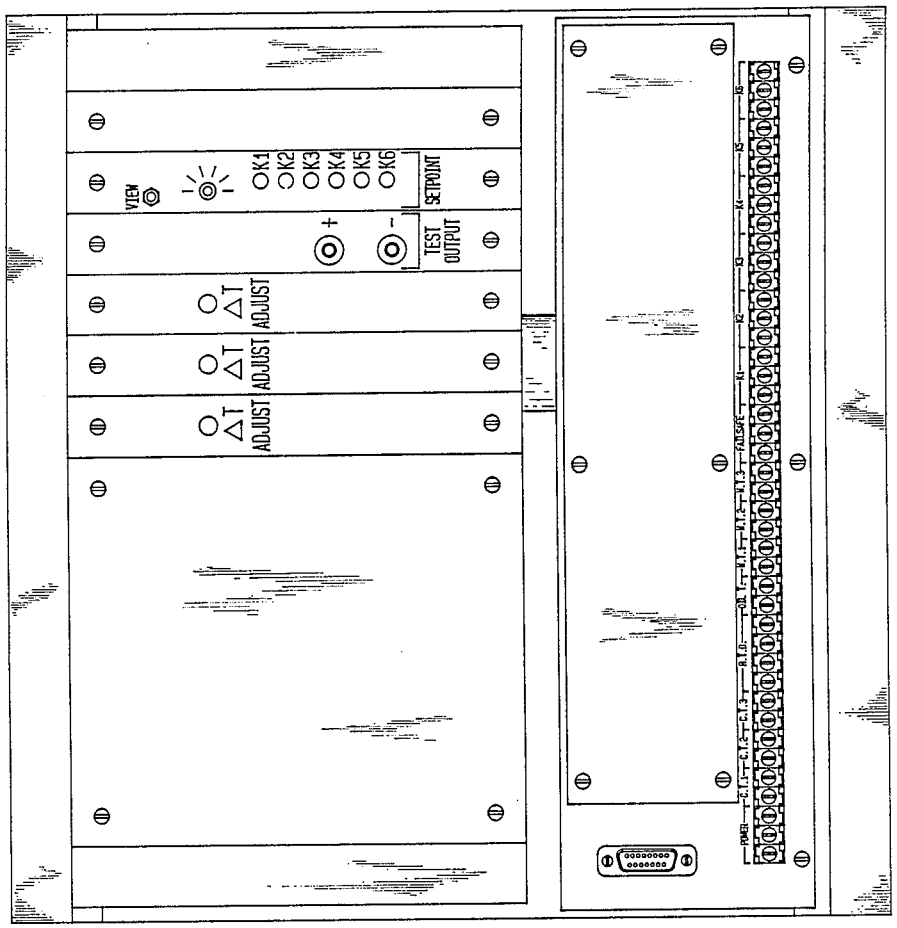
FIG. 6 is a front view of the multi-phase electronic temperature controller.
Figure 8:
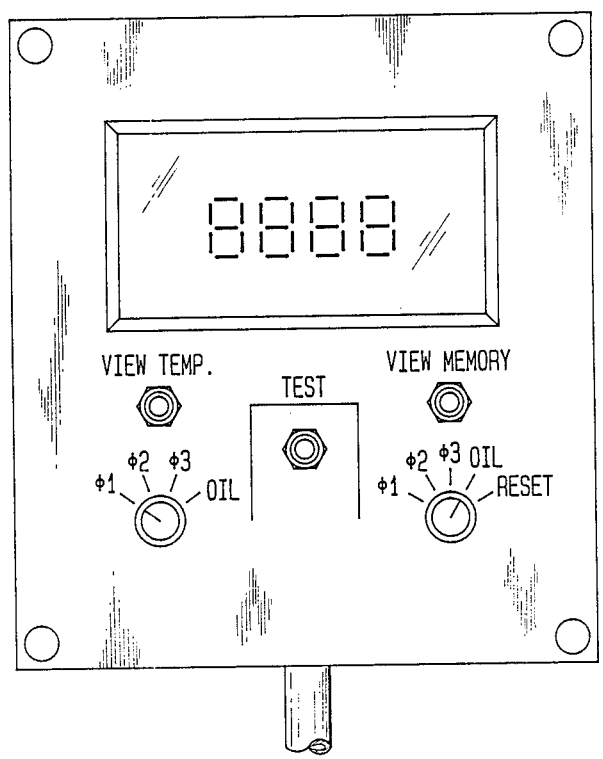
FIG. 8 is a front view of the indicator panel.

FIGS. 6 and 8 show the physical configuration of the multi-phase electronic temperature monitor. The main component assemblies are electronic housing 72, input-/output module 74, and remote front panel 76. All "Field" connections for the multi-phase device are made to and from the input/output module terminal block 78. FIG. 6 illustrates the modular construction of the multi-phase controller. Functional assemblies are mounted on the mounting plate. Within these assemblies, individual electronic modules are connected to perform required tasks. Modules are easily added, removed, repaired, replaced and/or examined. Similarly, configuration changes can be accomplished on a module-by-module or a function-by-function basis.

It should be unerstood that the initial load current signal may be obtained from the current transformer 36 normally provided by the manufacturers of the power transformer.

In addition, the initial liquid temperature signal may be obtained from any Resistance Temperature Detector 26 such as described in the Transducer Interfacing Handbook edited by Daniel H. Sheingold pp. 2-5, 10 and 11, as well as other thermal sensors such as thermocouples, thermistors, optical sensors, etc. The Transducer Interfacing Handbook was published by Analog Devices, Inc., Norwood, Mass. in 1980 and 1981 (Library of Congress Catalog Card No. 80-65520.

It should be understood that the computations and signal representations may be in any one of several forms or parameters. The parameter utilized in the preferred embodiment is D.C. voltage and the description here is based on that parameter.

In addition to the details provided herein, the circuitry shown in the boxes of FIGS. 2, 3, etc. is of the type shown and described in the related U.S. Pat. No. 4,745,571 which issued from application Ser. No. 772,133 filed Aug. 30, 1985 for a Modular Electronic Temperature Controller and Ser. No. 829,214 filed Feb. 14, 1986 for a Tri-Phase Electronic Temperature Controller.

I claim:

1. The method of electronically generating a final parameter representative of the hottest temperature of multi-phase power transformer windings immersed in a fluid, comprising the steps of;

measuring the temperature of the fluid, generating a first parameter proportional to the fluid temperature measurement, measuring the amount of current passing through each transformer winding of the multi-phase transformer, generating a second parameter for each phase of the multi-phase transformer, representative of an expected change in fluid temperature, proportional to the measured current passing through each transformer winding, providing a time constant response to the change of each of said winding current parameters, generating a square-law function to make a winding bias parameter for each winding, adding the parameters representative of fluid temperature and expected change of temperature resulting from the current passing through each transformer winding to obtain a winding parameter value representative of the sum of the measured temperature and expected change in temperature for each winding, selecting a largest winding parameter value of the multi-phase transformer windings, and using this said largest value to generate the final parameter proportional to the hottest spot winding temperature expected to result from the measured current.

2. The method of claim 1 further comprising the step of applying the resulting hottest winding temperature parameter to an indicator to indicate the hottest power transformer winding temperture.

3. The method of claim 2 in which the parameter is voltage.

4. The method of claim 1 in which the parameter is voltage.

5. The method of electronically representing the hottest winding temperature of a multi-phase power transformer immersed in a fluid comprising the steps of;

measuring the temperature of the fluid, generating at least a first parameter proportional to the fluid temperature measurement, establishing a temperature differential characteristic curve of the power transformer windings for different amounts of current flowing through the windings, measuring the amount of current passing through each transformer winding, adjusting a variable circuit to generate a voltage parameter representative of the temperature differential for each measured current, including a time constant for accurate modeling of temperature changes, adding the parameters representative of the fluid temperature and the temperature differential to obtain a parameter representative of the winding temperature for each winding of the power transformer, and selecting a highest winding current parameter from the parameters representative of the winding temperature for each winding of the power transformer, the parameter having the highest value selected which therefore represents the highest winding temperature.

6. The method of claim 5 further comprising the step of applying the highest winding temperature parameter to an indicator to indicate the hottest power transformer winding temperature.

7. The method of claim 6 in which the parameter is voltage.

8. The method of claim 5 in which the parameter is voltage.

9. A temperature simulator, indicator, control and warning system for liquid-filled electric multi-phase power transformers which normally have load currents flowing through their windings, comprising;

means for generating an electric signal representative of the temperature of the liquid in the liquid-filled transformer, means for generating an electric signal representative of a change in winding temperature due to load currents flowing through the transformer windings, time processing means for time processing the change-in-winding temperature signal to simulate the time which normally occurs between the time current flows through a winding until the winding heats up, a function generating means for generating a square-law change-in-winding temperature signal in accordance with the characteristics of the transformer winding, adder circuit means responsive to signal outputs of the measured liquid temperature means and function generating means for generating a voltage representative of the winding temperatures as represented by the sum of the liquid temperature and the said temperature differentials, and selection means responsive to the multi-phase signals to select the highest winding temperature signal proportional to and representative of the hottest winding temperature.

10. The apparatus of claim 9, further comprising indicating means for indicating the winding temperature and temperature control means for reducing the temperature of the transformer liquid when the temperature exceeds a preset amount.

11. Apparatus for monitoring the temperature condition in a multi-phase high voltage-transformer having current carrying transformer windings immersed in a liquid comprising:

means for measuring the temperature of the liquid,
   means for generating a voltage representative of the measured liquid temperature, alternate indicating means for indicating the measured liquid temperature, means for measuring the electrical current passing through each transformer winding, means for generating a voltage representative of the measured winding current and temperature differential resulting from said winding currents, including time constant means for time processing the winding current voltages to simulate the time differential associated with the time between change in current and the resulting temperature change in each winding, shaping means for generating the square-law° winding temperature change in accordance with the characteristics of the transformer winding, the output of the shaping means representing the temperature differential resulting from transformer current, adder circuit means responsive to the outputs of the measured liquid temperature means and a function generating means for generating a voltage representative of each winding temperature as represented by the sum of the liquid temperature and the said temperature differential for each winding, highest voltage selection means for selecting the highest winding temperature voltage from the various phases, first indicating means for indicating hottest winding temperature, multiple alternate indicating means for: measured oil temperature, "stored" highest oil temperature, simulated winding temperature of each phase, "stored" highest winding temperature for each phase, relay set point temperatures, and winding bias value for the present current transformer current inputs without time constants using time constant bypass switches, and multiple comparator means, responding to set point winding or oil temperature values that operate output relays for fan cooling, oil pump cooling, alarm and/or trip circuits.

12. The method of electronically determining the hottest winding temperature of a multi-phase transformer immersed in a fluid comprising the steps of;

measuring the temperature of the fluid and generating a voltage parameter representative of that temperature, computing the differential temperature for each transformer winding based on the current through each phase and generating a voltage parameter representative of said differential temperature, adding the parameters of measured temperature and differential temperature for each phase to generate a total temperature parameter for each phase, and selecting said largest total temperature parameter from the multi-phase transformer windings as an indication of the highest temperature.

13. Apparatus for electronically determining the hottest spot in a multi-phase power transformer immersed in a fluid comprising means for generating, for each transformer phase, a voltage parameter indicative of the measured temperature of the fluid and the incremental additional temperature expected from the heat derived from the current flowing through each phase, summing means for each phase to add the parameters representative of the measured temperature and incremental temperature, and selecting means for selecting the highest sum from the individual summing means, to thereby generate an indication of the highest winding temperature in the multi-phase transformer.

* * * * *